(12) United States Patent
Wait et al.

(10) Patent No.: US 11,734,188 B2
(45) Date of Patent: Aug. 22, 2023

(54) UNIFIED TRANSLATION MISS QUEUE FOR MULTIPLE ADDRESS TRANSLATION MODES

(71) Applicant: INTERNATIONAL BUSINESS MACHINES CORPORATION, Armonk, NY (US)

(72) Inventors: Charles D. Wait, Byron, MN (US); David Campbell, Austin, TX (US); Jake Truelove, Austin, TX (US); Jody Joyner, Austin, TX (US); Jon K. Kriegel, Rochester, MN (US); Glenn O. Kincaid, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 67 days.

(21) Appl. No.: 17/199,315

(22) Filed: Mar. 11, 2021

(65) Prior Publication Data
US 2022/0292028 A1    Sep. 15, 2022

(51) Int. Cl.
*G06F 12/1009* (2016.01)
*G06F 12/0864* (2016.01)
*G06F 12/0882* (2016.01)
*G06F 12/1045* (2016.01)

(52) U.S. Cl.
CPC ...... *G06F 12/1009* (2013.01); *G06F 12/0864* (2013.01); *G06F 12/0882* (2013.01); *G06F 12/1054* (2013.01); *G06F 12/1063* (2013.01)

(58) Field of Classification Search
CPC ............. G06F 12/0864; G06F 12/0882; G06F 12/1009; G06F 12/1054; G06F 12/1063
See application file for complete search history.

(56) References Cited

U.S. PATENT DOCUMENTS

| | | | |
|---|---|---|---|
| 9,600,419 B2 * | 3/2017 | Bybell | ............... G06F 12/1009 |
| 10,552,338 B2 | 2/2020 | Abhishek Raja | |
| 10,552,937 B2 | 2/2020 | Cooray | |
| 10,817,291 B2 | 10/2020 | Corbal | |
| 2013/0262817 A1 * | 10/2013 | Bybell | ............... G06F 12/1036 |
| | | | 711/208 |
| 2013/0339654 A1 | 12/2013 | Bybell et al. | |

(Continued)

OTHER PUBLICATIONS

Diesburg, S.; "Address Translation"; google.com (2010); 33 pgs.

(Continued)

*Primary Examiner* — Aracelis Ruiz
(74) *Attorney, Agent, or Firm* — Intelletek Law Group, PLLC; Gabriel Daniel, Esq.

(57) ABSTRACT

A unified memory address translation system includes a translation queue module configured to receive different modes of translation requests for a real address (RA) of a physical memory. A translation cache (XLTC) interface is configured to receive successful translation results for previous requests for an RA and provide the previous successful translation result to the translation queue module. A plurality of page table entry group (PTEG) search modules are coupled to the translation queue module. A unified translation walk address generation (UTWAG) module is configured to provide a translation support for each mode of the different modes of translation request. A memory interface is coupled between the UTWAG and the physical memory.

24 Claims, 7 Drawing Sheets

(56) References Cited

U.S. PATENT DOCUMENTS

| | | |
|---|---|---|
| 2014/0101361 A1 | 4/2014 | Gschwind |
| 2014/0101402 A1* | 4/2014 | Gschwind ............ G06F 12/1036 |
| | | 711/173 |
| 2016/0259735 A1* | 9/2016 | Evans ................. G06F 12/1036 |
| 2017/0371789 A1* | 12/2017 | Blaner ................ G06F 12/0831 |
| 2018/0239714 A1 | 8/2018 | Abhishek Raja |
| 2019/0213707 A1 | 7/2019 | Cooray et al. |
| 2020/0183856 A1 | 6/2020 | Campbell |

OTHER PUBLICATIONS

Friebe, A. "Network Address Translation (NAT) and Port Address Translataion (PAT)" globalknowledge.com (2010); 6 pgs.

Anonymous, "Multiple Absolute Address History Tables Combined With Branch Target Buffer (BTB) Absolute Address Prediction"; ip.com (2011), IPCOM000206764D; 4 pgs.

Anonymous, "Precise Merging Translation Queue in a Slice-Based Processor"; ip.com (2017); IPCOM000249317D; 3 pgs.

Anonymous, "System and Method for the Design of Virtual Load Miss Queue for the Microprocessor Core"; ip.com (2018); IPCOM000253606D; 5 pgs.

Mell, P. et al., "Recommendations of the National Institute of Standards and Technology"; NIST Special Publication 800-145 (2011); 7 pgs.

International Search Report and Written Opinion dated Jul. 14, 2022 in related international patent application No. PCT/EP2022/054650; 10 pgs.

\* cited by examiner

UNIFIED TRANSLATION MISS QUEUE FOR MULTIPLE ADDRESS TRANSLATION MODES

BACKGROUND

Technical Field

The present disclosure generally relates to computer systems, and more particularly, to managing memory tables in a processing system that supports multiple operating systems.

Description of the Related Art

In recent years, the operating system of a computing platform uses a combination of hardware and software to map memory addresses used by a program, sometimes referred to as virtual addresses, into physical addresses in the memory of the computer. In this way, the main storage appears as uniform segments in a contiguous address space. An operating system manages virtual address spaces and the assignment of real (physical) memory to virtual memory. Address translation hardware in the processor, sometimes referred to as the memory management unit (MMU), translates virtual addresses to physical addresses. The software within the operating system may provide a virtual address space that is larger than the capacity of the real memory, thereby referencing more memory than is physically present in the computing platform. By using virtual memory, the software can use more memory than might be physically available. Virtual memory simplifies application programming by camouflaging fragmentation of the physical memory.

Today's computing systems use different address translation mechanisms based on the type of operating system that is used. In order to support multiple computer system environments, address translation hardware should support multiple addressing modes when translating from an Effective Address (EA) to a Real Address (RA). As used herein, an effective address (EA) is the address that a program sees; a virtual address (VA) is the address used by the OS; and the real address (RA) is the address of the actual memory hardware. When translating an EA to ultimately an RA, a processor typically performs a time intensive process of walking the translation tables in order to produce the correct address so that the appropriate memory address can be accessed. The page table is where the operating system stores its mappings of virtual addresses (VA) to physical addresses, with each mapping also known as a page table entry (PTE). The time intensive process of converting an EA to VA and ultimately RA may involve many memory reads, cache accesses, and may halt progress of the hardware threads or the entire processor core.

SUMMARY

According to one embodiment, a unified memory address translation system includes a translation queue module configured to receive different modes of translation requests for a real address (RA) of a physical memory. A translation cache (XLTC) interface is configured to receive successful translation results for previous requests for an RA and provide the previous successful translation result to the translation queue module. A plurality of table entry group (PTEG) search modules (e.g., page and/or segment entry table group PTEG and STEG) are coupled to the translation queue module. A unified translation walk address generation (UTWAG) module is configured to provide a translation support for each mode of the different modes of translation request. A memory interface is coupled between the UTWAG and the physical memory.

In one embodiment, the XLTC interface, the PTEG search modules, and the translation queue module are shared by all translation supports of the UTWAG module.

In one embodiment, the modes of translation requests include at least one of: a hashed page table (HPT) request; a segment table request; a non-nested radix request; or a nested radix request.

In one embodiment, each of the translation requests is processed by a sequence module of the translation queue module.

In one embodiment, the sequence module of the translation queue module is configured to provide a round robin arbitration between the translation requests.

In one embodiment, the translation supports of the UTWAG module include at least one of: a partition table entry real address generation (PATE RA GEN); a segment table entry group virtual address generation (STEG VA GEN), operative to provide a translation from an effective address (EA) to a virtual address (VA); a segment table entry group real address generation (STEG RA GEN), operative to define an intermediate virtual address (STEG VA) to RA translation; a page table entry group real address generation (PTEG RA GEN); a radix host real address generation (RADIX HOST RA GEN); or a radix guest real address generation (RADIX GUEST RA GEN).

In one embodiment, a finite state machine is coupled each translation queue entry.

In one embodiment, the state machine is shared by all translation supports of the UTWAG module.

According to one embodiment, a method of providing a unified memory address translation, includes receiving a plurality of translation requests for a real address (RA) of a physical memory, by a translation queue module. Each of the plurality of translation requests is allocated to a translation walk queue entry of the translation queue module. For each translation walk queue entry, a starting virtual address (VA) and a translation mode from a corresponding translation request are determined. The VA and translation mode are provided to a unified translation walk address generation (UTWAG) module including a plurality of translation supports that accommodate different translation modes. The VA is translated to an RA, by the UTWAG module, based on the translation mode. The UTWAG does not translate the VA to RA by itself; rather, an HPT Translation flow based on an HPT request are followed. EA to VA is the goal of a "Segment Table Translation." When an "HPT Translation" begins, the XLTC is accessed to find a previous EA to VA translation, then the translation walk queue entry, with that "starting VA" executes the table walk to find the RA.

In one embodiment, the plurality of translation requests is not of uniform mode.

In one embodiment, the plurality of translation requests includes at least one of: a hashed page table (HPT) request; a segment table request; a non-nested radix request; or a nested radix request.

In one embodiment, a translation request of the plurality of translation requests is received by a translation cache (XLTC) interface from a translation cache (XLTC) operative to store one or more previous successful translation results.

In one embodiment, the XLTC interface, one or more page table entry group (PTEG) search modules, and the translation queue module are shared by all translation supports of the UTWAG module.

In one embodiment, the allocating of each translation request to one of the plurality of translation walk queue entries is upon determining that a matching previous result is not found in the XLTC.

In one embodiment, each translation walk queue entry is different for each clock cycle of a processor.

In one embodiment, a round robin arbitration is provided between the plurality of translation walk queue entries.

In one embodiment, the translation supports of the UTWAG module provide at least one of: a partition table entry real address generation (PATE RA GEN); a segment table entry group virtual address generation (STEG VA GEN), to provide an effective address (EA) to a virtual address (VA) translation; a segment table entry group real address generation (STEG RA GEN), to define a VA to an RA translation of the STEG VA; a page table entry group real address generation (PTEG RA GEN); a radix host real address generation (RADIX HOST RA GEN); or a radix guest real address generation (RADIX GUEST RA GEN).

In one embodiment, a finite state machine is coupled each translation queue entry.

In one embodiment, the state machine is shared by all translation supports of the UTWAG module.

According to one embodiment, a computing device includes a processor, a translation queue module configured to receive different modes of translation requests for a real address (RA) of a physical memory, a translation cache (XLTC) interface configured to receive successful translation results for previous requests for an RA and provide the previous successful translation result to the translation queue module, and a plurality of page table entry group (PTEG) search modules coupled to the translation queue module. There is a memory coupled to the processor. A unified translation walk address generation (UTWAG) software module is stored in the memory, wherein an execution of the UTWAG by the processor configures the computing device to provide a translation mode for each mode of the different modes of translation request. There is a memory interface coupled between the UTWAG and the physical memory.

In one embodiment, the XLTC interface, the PTEG search modules, and the translation queue module are shared by all translation supports of the UTWAG module.

In one embodiment, the modes of translation request include at least one of: a hashed page table (HPT) request; a segment table request; a non-nested radix request; or a nested radix request.

In one embodiment, the translation supports of the UTWAG module include at least one of: a partition table entry real address generation (PATE RA GEN); a segment table entry group virtual address generation (STEG VA GEN), operative to provide an effective address (EA) to a virtual address (VA); a segment table entry group real address generation (STEG RA GEN), operative to define a an intermediate virtual address (STEG VA) to RA translation; a page table entry group real address generation (PTEG RA GEN); a radix host real address generation (RADIX HOST RA GEN); or a radix guest real address generation (RADIX GUEST RA GEN).

In one embodiment, a finite state machine is coupled to each translation queue entry.

In one embodiment, the state machine is shared by all translation supports of the UTWAG module.

By virtue of sharing of various hardware and/or software components by the various translation modes, an improved area and power efficiency is provided for the address translation. Indeed, the combination of the iterative process of the translation walk queue together with the UTWAG, results in an efficient use of chip real estate, reduced power consumption, and improved performance for translation requests. These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Overview

Figure 1:
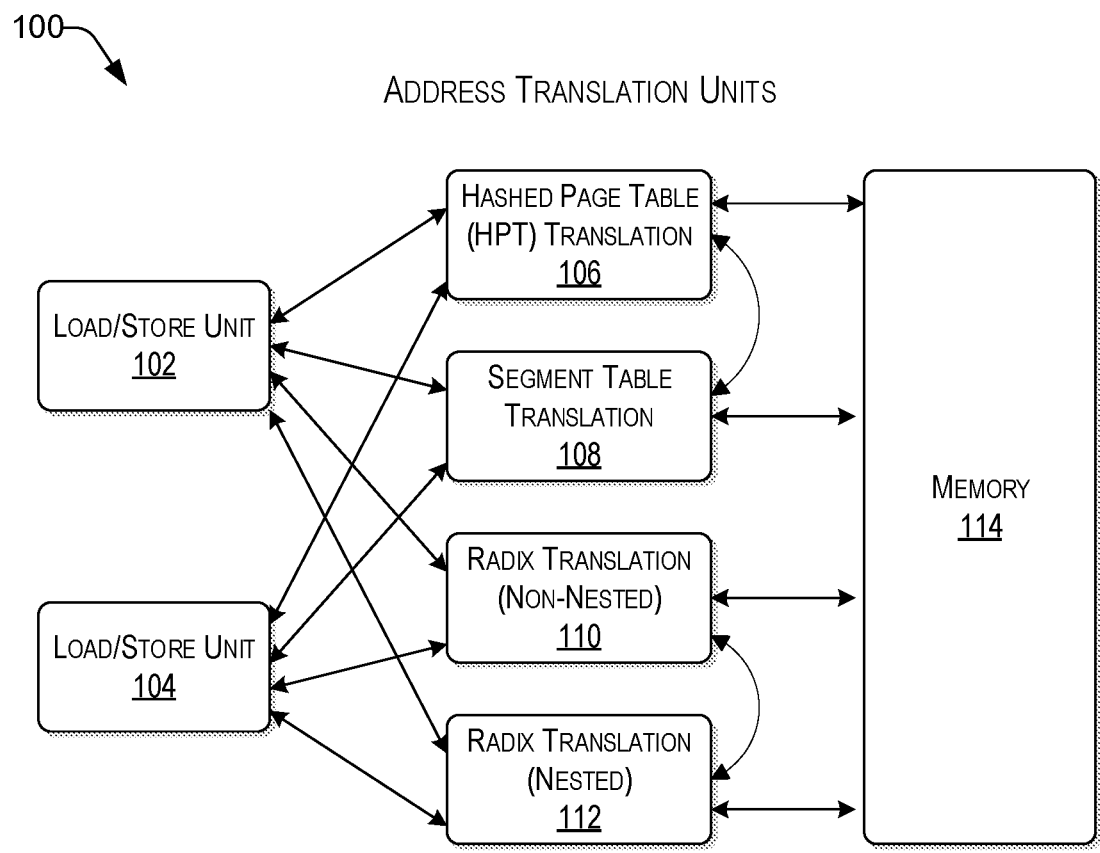
FIG. 1, which is a conceptual block diagram of a unified memory address translation system supporting multiple translation modes, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure generally relates to systems and methods of managing memory tables in a processing system that supports multiple operating systems. Today, processor cores have been developed that can support different operating environments and virtual machines. For example, part of a computing system can run a radix mode of translations, which uses a series of nested tables instead of a single large hashed table to find page table entries for its particular operating system (OS), whereas another part of the system runs a power PC, which uses a different mode of translation for its corresponding OS. For example, a hypervisor, sometimes referred to as a virtual machine monitor (VMM), can create and run virtual machines (VMs) by isolating the hypervisor operating system and resources from the virtual machines and enables the creation and management of such machines, which can be based on different OS, while sharing the same hardware. Each operating system may involve a different address translation based on different page tables. When a process requests access to data in its memory, it is the responsibility of the OS to map the virtual address (VA) provided by the process to the physical address of the actual memory where that data is stored. The page table is where the operating system stores its mappings of virtual addresses to physical addresses, with each mapping also known as a page table entry (PTE). Since different operating systems are used, there may be different translation units, sometimes referred to herein as translation modes.

PTEs are typically used to translate the virtual addresses seen by an operating system into physical addresses used by the hardware to process instructions of the application program. The hardware that performs such translation is sometimes referred to as a memory management unit (MMU). Each entry in a page table includes an indication of whether or not the corresponding page is in physical memory. If it is in physical memory, the page table entry will include the actual memory address at which the page is stored. When a reference is made to a page by the hardware, if the page table entry for the page indicates that it is not currently in physical memory, the hardware raises a page fault exception, invoking the paging supervisor component of the operating system, discussed in more detail later.

Typical implementations dedicate hardware table walk logic for each address translation mode due to the uniqueness of each mode. There are separate units within a processor, each with their own interfaces to handle memory accesses, load/store data translation requests, and instruction fetch address translation requests.

In various scenarios, systems can have one page table for the whole system, separate page tables for each application, a tree of page tables for large segments, or a combination thereof. If there is only one page table, different applications running at the same time use different parts of a single range of virtual addresses. If there are multiple page or segment tables, there are multiple virtual address spaces and concurrent applications with separate page tables redirect to different actual addresses.

Multiple translation units introduce increased complexity and chip area to accommodate the multiple interfaces. Address translation latency and performance are impacted as well since the requesting units handle the unique aspects of each translation unit. For example, Segment Table Translation can involve intermediate hashed page table (HPT) translations, which could require handling by the requesting unit, a separate side-band interface between translation-units, or worse, replication of HPT translation logic. Also, radix translation is quite different from HPT in that it uses a series of nested tables instead of a single large hashed table to find page table entries (PTE) defining the EA to RA translation. Known computing systems do not support multiple translation modes, let alone in an efficient way.

Accordingly, the teachings herein provide in a computer system and methods, for a processor that supports multiple address translation modes, a translation walk queue that supports a plurality of requests, wherein each translation walk can be in a different mode and at different stages in the translation flow, and a unified translation walk address generator that is shared by the plurality of transition modes and provides all intermediate addresses used for a translation. By virtue of sharing of various hardware and/or software components by the various translation modes, an improved area and power efficiency is provided for the address translation. The techniques described herein may be implemented in a number of ways. Example implementations are provided below with reference to the following figures.

Example Architecture

Reference now is made to FIG. 1, which is a conceptual block diagram of a unified memory address translation system 100 supporting multiple translation modes, consistent with an illustrative embodiment. The unified address translation system 100 facilitates sharing of various translation blocks without replicating logic and hardware component components. The system 100 includes a plurality of load/store units, represented by blocks 102 and 104, which relate to units in the processor core that are operative to receive data and write the same into a register, represented by physical memory 114. To that end, these units 102 and 104 have an effective address (EA) which is to be translated into a physical address, sometimes referred to herein as a real address (RA) of the (physical) memory 114. Based on the operating system (OS) used of the corresponding load/store unit 102 or 104, there may be different methods of translating the EA into an RA, represented by the plurality of translation units 106 to 112. In various scenarios, a hashed page table (HPT) translation, a segment table translation 108, a radix translation that is non-nested 110, or a radix translation table that is nested 112 may be used.

Some processor architectures corresponding to a load/store unit may use hashed page table (HPT) to dynamically map virtual memory addresses to physical ones. For example, in HPT, the virtual page number in the virtual address is hashed into the hash table. HPTs can be used, for example, to handle address spaces higher than 32 bits. Each entry in the hash table is a group of PTE's or PTEG where each PTE includes a VA and corresponding RA. When the VA matches a PTE VA, the corresponding RA is accessed such that the HPT is able to provide the RA in the memory 114.

Some processor architectures may use a radix tree page table (e.g., 110 or 112) to dynamically map virtual memory addresses to physical ones. The OS manages physical resources at fixed, page-sized allocation units with address translation determined by the OS and stored in the radix-tree page table. Mapping a virtual address used by the OS to a physical (i.e., RA) of the memory 114 involves traversing the radix tree, sometimes referred to herein as "walking the page table," which may involve multiple memory accesses. For example, several memory accesses for translation and data fetches may be involved for a single load operation.

While four address translation units (i.e., 106 to 112) are illustrated in FIG. 1 to avoid clutter, it will be understood that additional address translation units are supported by the teachings herein. Typically, each of the address translation units 106 to 112 would be independent and not share any components, thereby resulting in additional complexity, chip area, and power consumption. In contrast, the teachings herein facilitate sharing of various translation blocks of a translation system, without replicating logic and hardware components, as will be better understood in the context of the discussion of FIG. 2 below.

Figure 2:
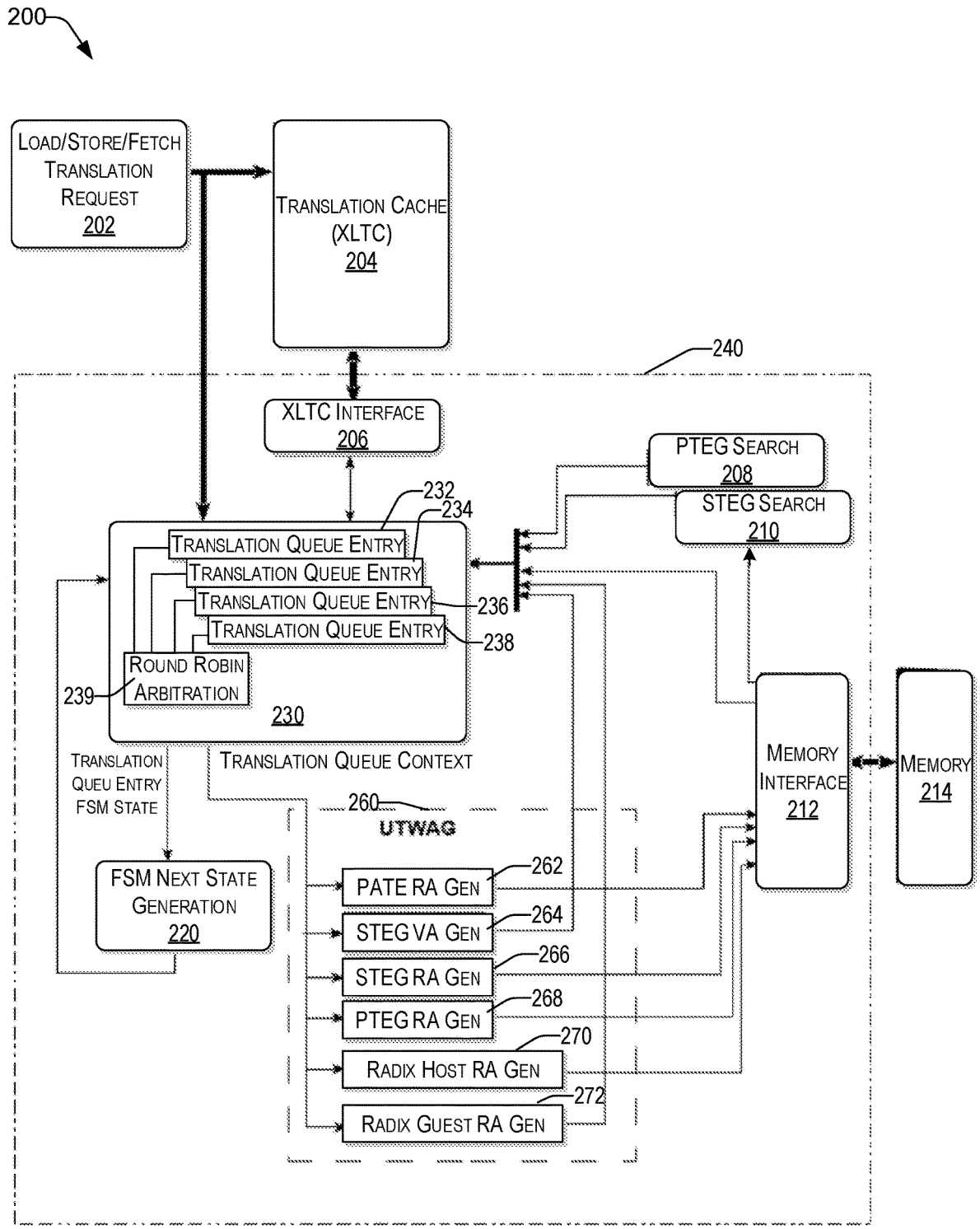
FIG. 2 is a more detailed block diagram of a unified memory address translation system supporting multiple translation modes, consistent with an illustrative embodiment.

FIG. 2 is a more detailed block diagram of a unified memory address translation system 200 supporting multiple translation modes, consistent with an illustrative embodiment. There is a translation queue module 230 configured to receive address translation request that may be of arbitrary mode. For example, the translation request may be a hashed page table (HPT) translation request, a segment table translation request, a non-nested radix request, nested radix request, etc. There is a translation cache (XLTC) interface 206 configured to receive a translated cache request from a translation cache 204 and provide it the translation queue module 230. The translation cache (XLTC) 204 is operative to store previous successful translation results. For example, the XLTC 204 may include different types of previous translations, such as EA to VA, VA to RA, and EA to RA. There is a page table entry group (PTEG) search module 208 and/or a segment table entry group module 210 coupled to the translation queue module 230. A STEG is a group of STEs. A segment table translation searches a STEG for an STE in a similar way. For example, segment table entries are used to translate an EA to a VA.

The translation module 240 includes a Unified Translation Walk Address Generation (UTWAG) module 260 configured to provide a translation support for each mode of translation request of the plurality of translation requests. The translation supports of the UTWAG includes at least one of: a partition table entry real address generation (PATE RA GEN) 262; segment table entry group virtual address generation (STEG VA GEN) 264, which provides an EA to VA address translation; segment table entry group real address generation (STEG RA GEN) 266, which reads a group of STEs where a matching STE provides an EA to VA address translation; a page table entry group real address generation (PTEG RA GEN) 268, a radix host real address generation (RADIX HOST RA GEN) 270; or a radix guest real address generation (RADIX GUEST RA GEN) 272. An HPT PTE (which may be provided by block 208) defines a VA to RA translation.

The UTWAG 260 is coupled to a memory interface 212 operative to communicate with a physical memory 214. In some embodiments, the translation module 240 includes a finite state machine next stage generation module 220. A finite state machine can be thought of as having two parts: a set of latches defining the current state of the machine; and a logic block operative to determine the next state of the machine. In translation queue module 230, each translation queue entry logically has its own independent FSM since each entry has a set of latches defining their current state. In a given processor cycle, the arbitration 239 decides which queue entry has access to the shared FSM next state generation logic block 220.

The Memory Access Interface 212, Translation Cache (XLTC) Read/Write Interface 206, and XLTC interface 206 are all shared by all the translation supports 262 to 272 of the UTWAG 260, thereby conserving power and/or chip real estate, while reducing the complexity of the unified memory address translation system 200.

By way of example and not by way of limitation, the architecture 200 of FIG. 2 illustrates a translation queue module 230 that accommodates a four entry translation walk, although it will be understood that the teachings herein support any number of translation walk queues in the translation queue module 230. Each entry into the translation queue module 230 is capable of independently accommodating a translation request utilizing any of the architected translation entries 232 to 238, sometimes referred to herein as translation modules. For example, the transaction walk modes may include HPT translation 232, segment table translation 234, radix translation that is non-nested 246, radix translation that is nested 238, etc. In one embodiment, the translation queue module 230 includes a sequence module 239 operative to provide a round robin arbitration between the different translation walk queue entries 232 to 238. Each of these translation walk queue entries 232 to 238 may be of a different type. For example, translation walk queue entry 232 may be performing a segment table walk, translation walk queue entry 234 may be performing a nested radix walk, translation walk queue entry 236 may be performing a non-nested radix walk, and so on. Accordingly, the architecture 200 supports different modes of threads automatically.

In addition to the queue entries 232 to 238, architecture 200 includes a Unified Translation Walk Address Generation (UTWAG) block 260, operative to generate all the intermediate addresses that are relevant to ultimately achieve an RA. Significantly, the UTWAG is configured such that the Memory Access Interface 212, Translation Cache (XLTC) 204, XLTC interface 206, Read/Write Interface, sometimes referred to herein as the XLTC interface 206, and Translation Request Interface 202 are shared by all the translation supports 262 to 272. The UTWAG 260 also provides the ability for the translation modes to share translate functions of one mode with another, which is explained in more detail later. Each processor cycle can be a completely different thread mode. The combination of the iterative process of the translation walk queue entry 232 to 238 together with the UTWAG, results in an efficient use of chip real estate, reduced power consumption, and improved performance for translation requests.

Consider for example a Power10 (P10) processor when the Load/Store unit or Instruction Fetch unit 202 requests an effective address (EA) to be translated. This request can be sent to Translation Cache (XLTC) 204 that includes previous translation results. These previous translations may be from EA to Virtual Address (VA), VA to RA translation, or EA to RA directly; depending on the address translation mode. If no previous results are found in the XLTC 204, the translation request 202 is allocated to one of the translation walk queue entries 232 to 238. As part of the request, context information defining the translation mode is provided along with the starting EA. For example, in the PowerPC architecture, this could be a Segment Table EA-to-Virtual Address translation, a Hashed Page Table Virtual Address to Real Address translation, or a Radix EA-to-RA translation.

Each translation request includes an address (e.g., EA or VA) together with context information (e.g., mode of request). Utilizing the context information, the translation walk queue entry begins. All translation modes involve a 'Partition Table Entry' (PATE) 262 that defines the base addresses of the individual translation tables (Segment Table, Hashed Page Table, or Radix (level 1) Table). The UTWAG 260 efficiently provides this common function by generating the address of the PATE for each mode and the RA in the Memory 214.

Example Processes

Figure 3:
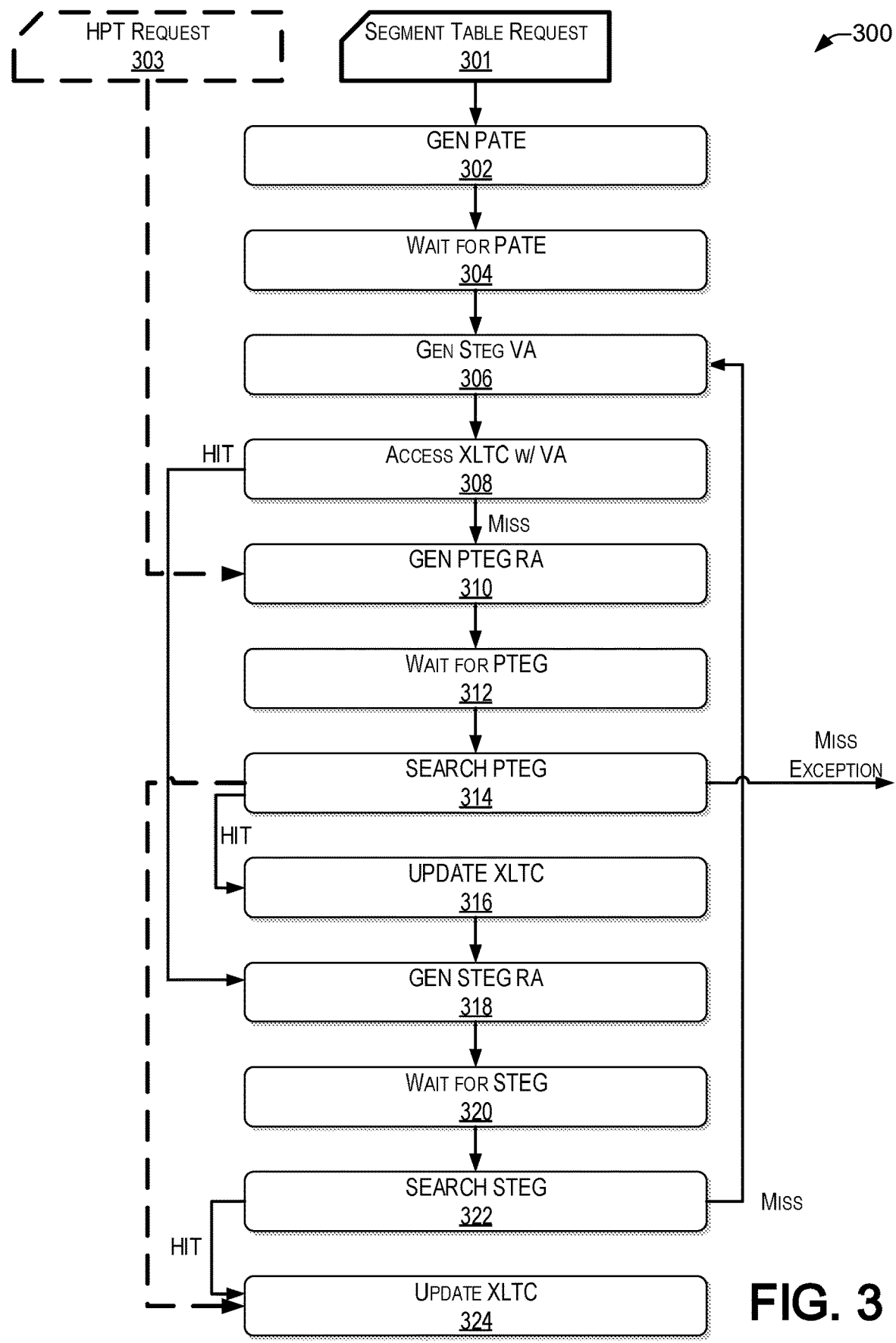
FIG. 3 is an example process flow that accommodates a hashed page table (HPT) request and a segment table request while sharing various components of the unified translation system of FIG. 2.
Figure 4:
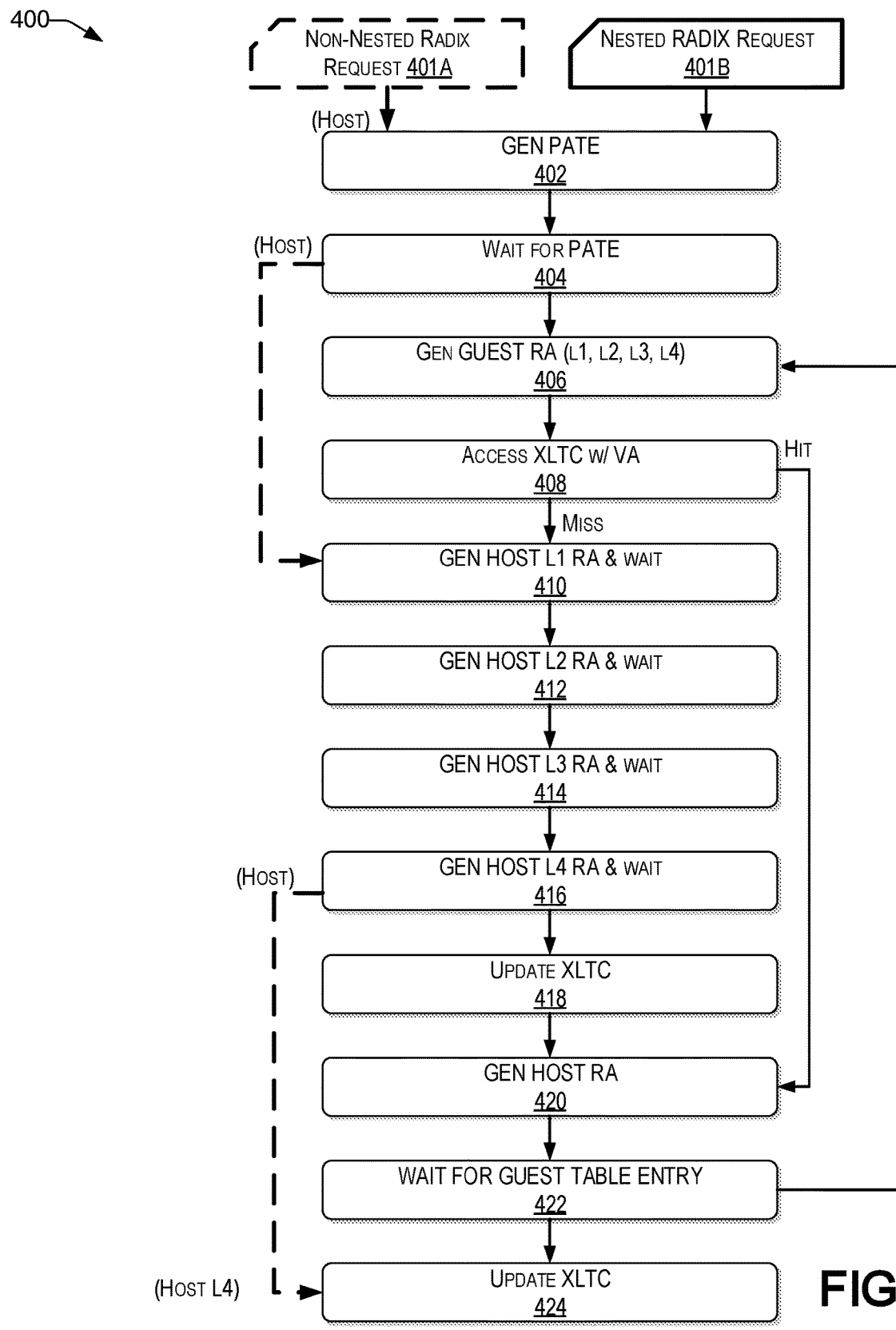
FIG. 4 is an example process flow that accommodates both nested and un-nested radix requests.

With the foregoing overview of the example architectures 100 and 200, it may be helpful now to consider a high-level discussion of example processes. To that end, FIGS. 3 and 4 present illustrative processes 300 and 400 of translating memory addresses having different modes, consistent with illustrative embodiments. Processes 300 and 400 are each illustrated as a collection of blocks in a logical flowchart, which represents sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the processes 300 and 400 are described with reference to the architecture of FIG. 2.

FIG. 3 is an example process flow that accommodates an HPT request and a segment table request while sharing various components of the unified translation system 200 of FIG. 2. For example, the Memory Access Interface 212, Translation Cache (XLTC) 204, XLTC interface 206, Read/Write Interface 212, and Translation Request Interface 202 are shared by all the translation modes used in response to the HPT request 302 and segment table request 304.

At block 303, an HPT request is received, comprising a virtual address (VA) and context that indicates the mode of translation request. At block 310, the virtual address is hashed into a page table entry (PTE) group real address (GEN PTEG RA) and sent to the memory 214. At block 312, the system waits for a predetermined time period to receive the PTEG from the memory.

At block 314, the PTEG is searched for a PTE hit. If there is no PTE hit (i.e., there is a "MISS"), the translation queue module 230 identifies the address (e.g., VA provided with the translation request) as an exception. For example, the FSM next state generation module 220 would transition to an "exception" state. However, if there is a PTE "HIT," the process continues with block 324, where the translation cache (XLTC) is updated with the RA.

Process 300 also illustrates another entry point, represented by a segment table request 301. At block 302, upon receiving the segment table request comprising an effective address (EA), a partition table entry is generated based on the provided translation request context (GEN PATE). At block 304, the system waits a predetermined time period until the partition table entry is generated. At block 306, a segment table entry group (STEG VA) is generated. Stated differently, an intermediate virtual address (VA) is provided. The segment table entry group (STEG), being a virtual address, needs a translation itself (i.e., because it is an intermediate translation of the real address).

At block 308, in one embodiment, the translation cache XLTC 204 is checked to determine whether this virtual address (VA) was translated before. If this virtual address was not translated before and therefore not available in the translation cache (XLTC) 204 (i.e., a "MISS" at determination block 308), the process continues with blocks 310 to 314, which are seamlessly integrated with the HPT request 303 discussed previously. Stated differently, the logic and/or hardware that is already in place with respect to the HPT request 303 can be successfully reused for the segment table request walk 301.

More specifically, at block 310, the virtual address is hashed into a page table entry (PTE) group real address (GEN PTEG RA) and sent to the memory 214. At block 312, the system waits for a predetermined time period to receive the PTEG from the memory. At block 314, the PTEG is searched for a PTE "HIT." If there is no PTE "HIT" (i.e., there is a "MISS" at determination block 314), the system identifies the address as an exception. However, if there is a PTE "HIT," the process continues with block 316, where the translation cache (XLTC) 204 is updated with the real address (RA). This real address (RA) is sent to memory 214 and the process continues with block 318, where a segment table entry group real address (GEN STEG RA) is provided and sent to the memory 214. At block 320, the system waits for a predetermined time period to receive the segment table group (STEG) data from the memory 214.

At block 322 a segment table group search is performed (SEARCH STEG). If it is successful (i.e., a "HIT" at determination block 322), the process continues with block 324, where the translation cache (XLTC) 204 is updated with the VA. The goal of the segment table translation request is to translate an EA to VA by using a segment table entry (STE). More specifically, the EA portion and the corresponding virtual address found in the STE are stored in the XLTC 204 such that further access to the same EA page will be a "HIT" to avoid a "MISS" in the next search.

However, if the SEARCH STEG is not successful (i.e., a "MISS" at determination block), the process returns to block 306 and the iterative process continues. For example, this iterative looping function could involve four separate iterations.

Returning to block 308, if the virtual address was translated before (i.e., a "HIT" at determination block 308), the walk is substantially simplified and goes directly to block 318 and the process continues as discussed hereinabove.

If the address mode included in the request context information 202 is for a Radix EA-to-RA translation, a different flow is followed that also efficiently shares the XLTC interface 206 and memory interface 212. For example, some processors use a radix tree of depth 4 for effective-to physical translation in native application. There may be four layers in the tree with the fourth layer L4 being the root of the tree. Each node in the tree includes a table representing the nodes in the subsequent level of the tree. The node populates a single physical memory frame. Each table entry maintains the physical frame number (e.g., pointer) of the child node and the OS imposed permissions for the entire subtree. The translation process, sometimes referred to herein as a page table walk is iterative and traverses a path from the root to a leaf node. In each step, subsequent bit sets from the source effective address (EA) are used to index the tables in subsequent nodes along the path.

In this regard, reference now is made to FIG. 4, which is an example process flow that accommodates both nested and un-nested radix requests. To avoid clutter, the process 400 has been separated from process 300 of FIG. 3, while it will be understood that these processes can be integrated. In process 400, the nested radix flow is provided by a solid line, whereas the non-nested is provided by a dashed line.

At block 401A, a non-nested radix request is received, comprising an effective address and context that indicates the mode of request (i.e., non-nested radix). At block 402, upon receiving the nested radix request, a partition table entry is generated based on the received translation context (GEN PATE). At block 404, the system waits a predetermined time period until the partition table entry is generated.

The process then proceeds to block 410, where a host address is generated (GEN HOST RA), initially for L1. Radix goes through a series of tables, which are referenced serially. When L1 is accessed, it includes a pointer to the L2 host table, and so on. Four such tables are walked, as indicated by blocks 410 to 416 until a correct page table entry PTE is identified. The process then continues with block 424, where the translation cache (XLTC) is updated with the RA.

As mentioned above, process 400 can also accommodate a nested radix request. For example, at block 401B a nested radix request is received, comprising an effective address and context that indicates the mode of request (i.e., nested radix). At block 402, upon receiving the nested radix request, a partition table entry is generated based on the received translation context (GEN PATE). At block 404, the system waits a predetermined time period until the partition table entry generation is complete.

The process then continues with block 406, where a guest real address is generated (GEN GUEST RA) for each of the four radix levels L1 to L4. Stated differently, the effective address generates guest level addresses that are further refined before an address can be sent to the memory, as discussed in more detail below.

At block 408, in one embodiment, the translation cache XLTC 204 is checked to determine whether this guest real address was translated before. If this guest real address was not translated before (i.e., a "MISS" at determination block 308), the process continues with block 410, where a host address is generated (GEN HOST RA), initially for L1. As in the non-nested case discussed previously, radix goes through a series of tables, which are referenced serially, as indicated by blocks 410 to 416, until a correct page table entry PTE is identified. The process then continues with block 418, where the translation cache (XLTC) 204 is updated with the RA.

At block 420, a host real address is generated (GEN HOST RA). In this regard, it is noted that for nested radix, the EA to RA translation is included in the Guest L4 entry. Each Guest entry (L1, L2, L3, L4) is initially addressed by a Guest RA. However, Guest RA's cannot be sent to memory 214 and therefore are translated to a Host RA, as discussed hereinabove. Block 420 is the Host RA that was translated from Guest RA (block 406).

At block 422, the system waits for the completion of the guest table entry for the subject radix level (e.g., L1). The iterative process continues by returning to block 406 until all radix levels (i.e., L1 to L4 in the present example) have been evaluated for a guest table entry. The process continues with block 424, where the translation cache (XLTC) is updated with the RA.

Returning to block 408, if the guest address was translated before (i.e., a "HIT" at determination block 408), the process is substantially simplified and goes directly to block 420 and the process continues as discussed hereinabove.

Example Computer Platform

Figure 5:
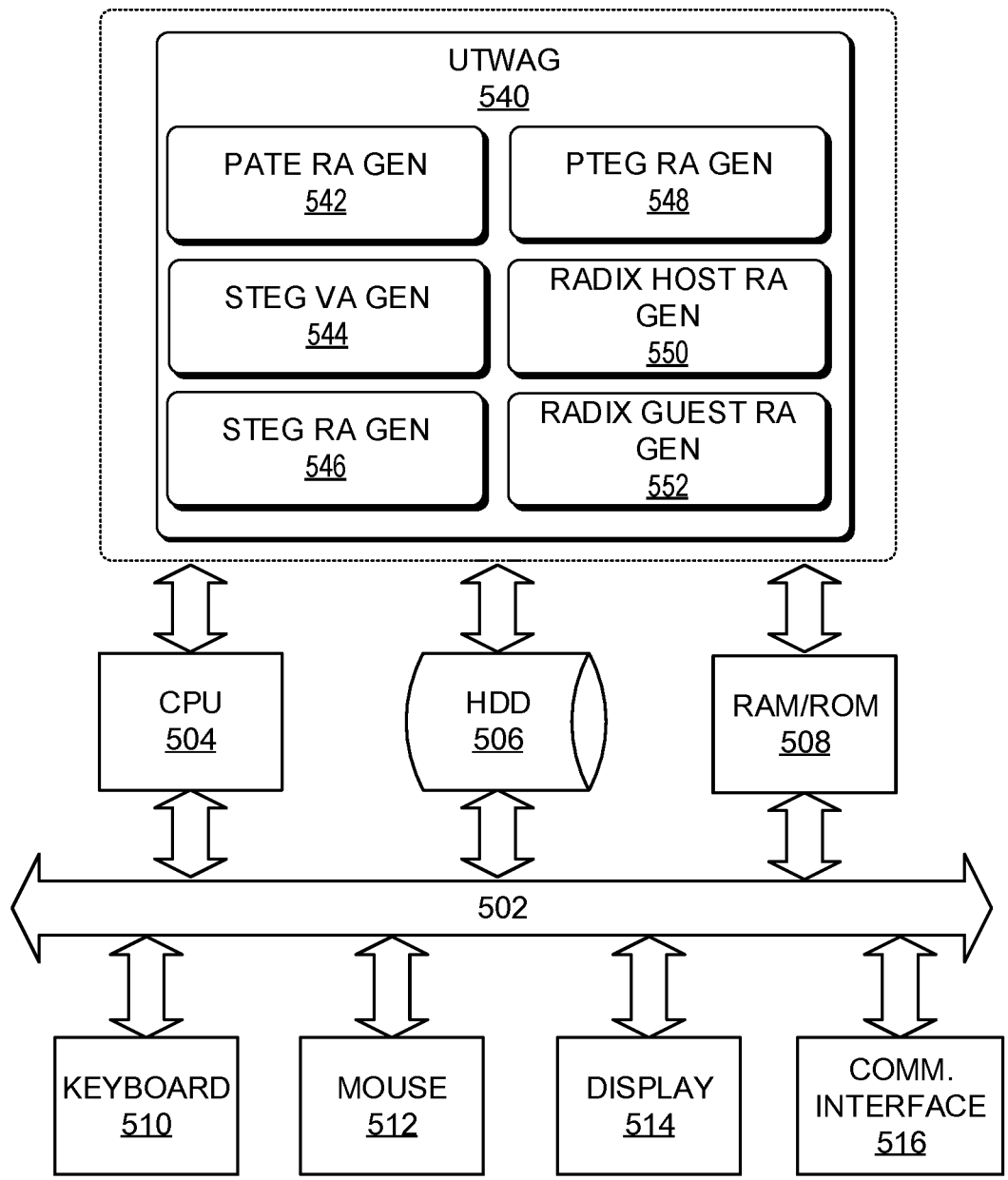
FIG. 5 provides a functional block diagram illustration of a computer hardware platform that can be used to host a Unified Translation Walk Address Generation (UTWAG) module.

In one embodiment, functions relating to providing a unified memory address translation system, can be performed with the use of one or more computing devices. FIG. 5 provides a functional block diagram illustration of a computer hardware platform 500 that can be used to host a Unified Translation Walk Address Generation (UTWAG) module 540.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the UTWAG engine 540, in a manner described herein. The UTWAG engine 540 may have various modules configured to perform different functions, such those discussed in the context of FIG. 2 and others. For example, there may be a PATE RA GEN 542, STEG VA GEN 544, STEG RA GEN 546, PTEG RA GEN 548, RADIX HOST RA GEN 550, and RADIX GUEST RA GEN 552 modules performing the functions discussed herein. While modules 542 to 552 are illustrated in FIG. 5 to be part of the HDD 506, in some embodiments, one or more of these modules may be implemented in the hardware of the computing device 500. For example, the modules discussed herein may be implemented in the form of partial hardware and partial software. That is, one or more of the components of the UTWAG engine 540 shown in FIG. 5 may be implemented in the form of electronic circuits with transistor(s), diode(s), capacitor(s), resistor(s), inductor(s), varactor(s) and/or memristor(s). In other words, UTWAG engine 540 may be implemented with one or more specially-designed electronic circuits performing specific tasks and functions described herein by components of the CPU and/or modules of the RAM/ROM 508.

Example Cloud Platform

As discussed above, functions relating to providing a unified memory address translation system, may include a distributed computing and/or storage architecture as in a cloud. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
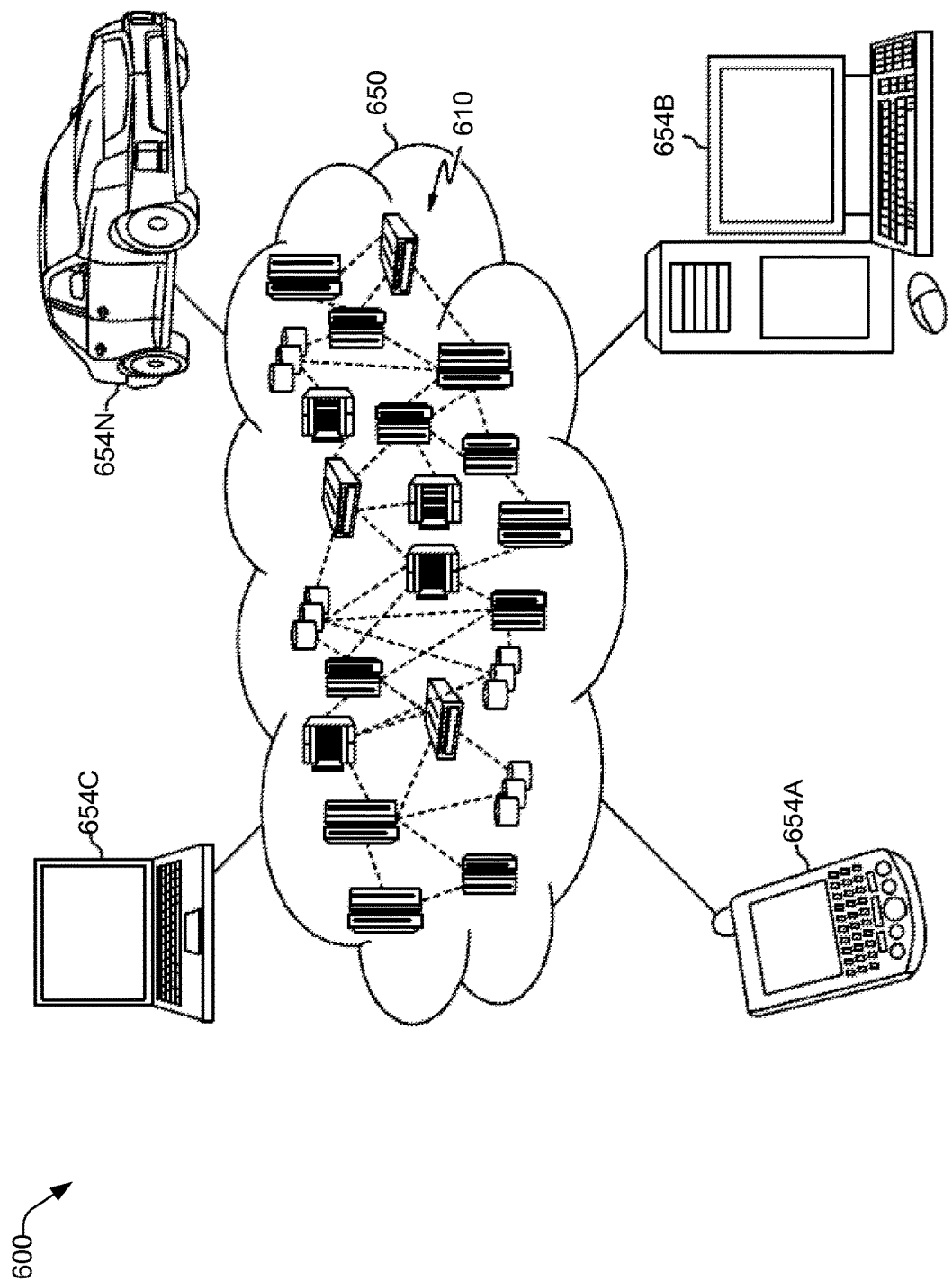
FIG. 6 depicts a cloud computing environment, consistent with an illustrative embodiment.

Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
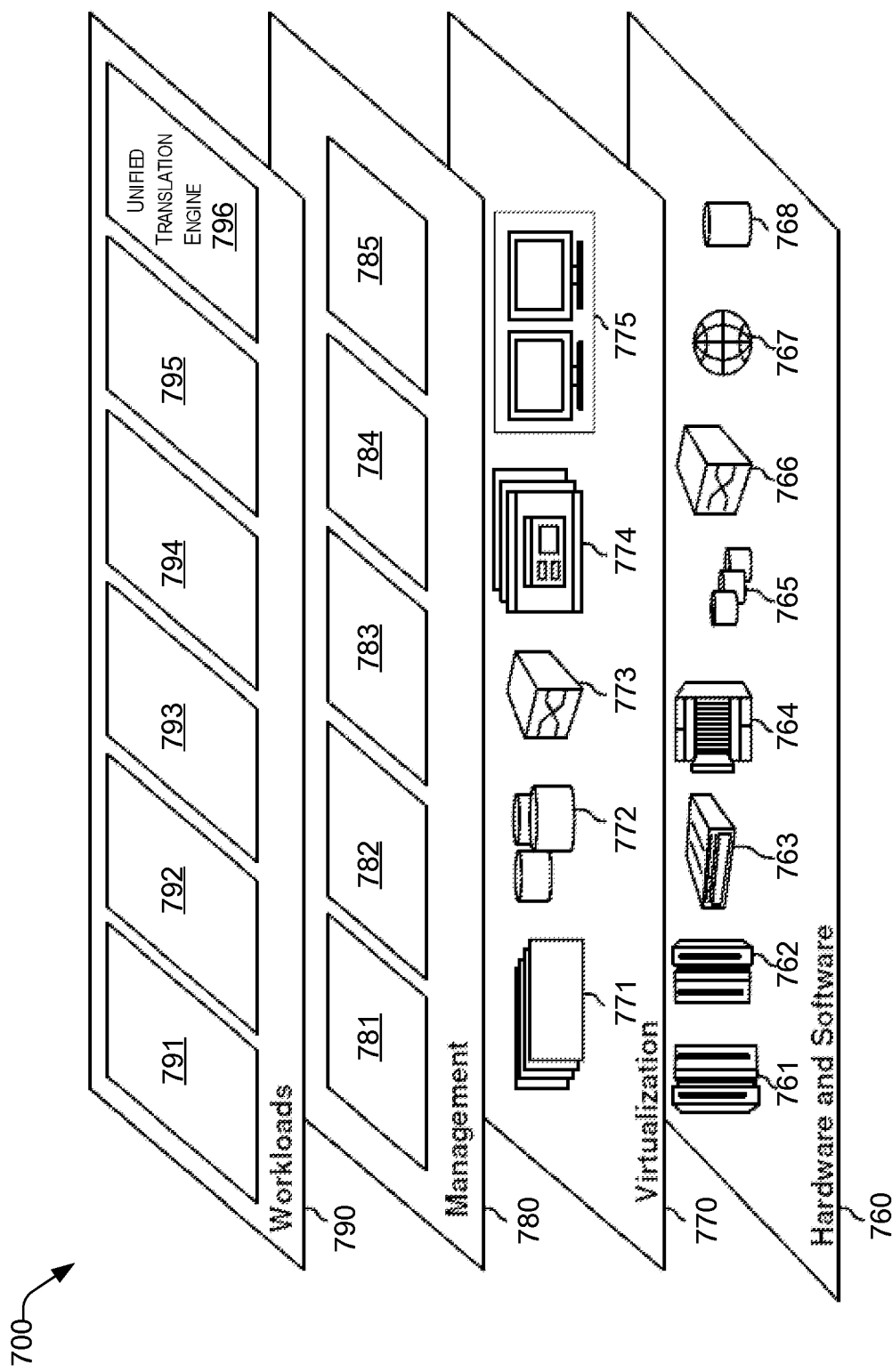
FIG. 7 depicts abstraction model layers, consistent with an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and Unified Translation Engine 796, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A unified memory address translation system comprising:
    a translation queue module configured to receive different modes of translation requests for a real address (RA) of a physical memory;
    a translation cache (XLTC) interface configured to receive successful translation results for previous requests for an RA and provide the previous successful translation result to the translation queue module;

at least one of a page table entry group (PTEG) search module or a segment table entry group (STEG) search module coupled to the translation queue module;

a unified translation walk address generation (UTWAG) module configured to provide a translation support for each mode of the different modes of translation request; and a memory interface coupled between the UTWAG and the physical memory, wherein each of the translation requests is processed by a sequence module of the translation queue module.

2. The system of claim 1, wherein the XLTC interface, the PTEG search module STEG search module, and the translation queue module are shared by all translation modes.

3. The system of claim 1, wherein the modes of translation requests comprise at least one of:
a hashed page table (HPT) request;
a segment table request;
a non-nested radix request; and
a nested radix request.

4. The system of claim 1, wherein the sequence module of the translation queue module is configured to provide a round robin arbitration between the translation requests.

5. The system of claim 1, wherein the translation supports of the UTWAG module include at least one of:
a partition table entry real address generation (PATE RA GEN);
a segment table entry group virtual address generation (STEG VA GEN) operative to provide a translation from an effective address (EA) to a virtual address (VA);
a segment table entry group real address generation (STEG RA GEN) operative to define an intermediate virtual address (STEG VA) to a real address (RA) translation;
a page table entry group real address generation (PTEG RA GEN);
a radix host real address generation (RADIX HOST RA GEN); or
a radix guest real address generation (RADIX GUEST RA GEN).

6. The system of claim 1, further comprising a finite state machine coupled to each translation queue entry of the translation queue module.

7. The system of claim 6, wherein the state machine is shared by all translation supports of the UTWAG module.

8. A method of providing a unified memory address translation, comprising:
receiving a plurality of translation requests for a real address (RA) of a physical memory, by a translation queue module;
allocating each of the plurality of translation requests to a translation walk queue entry of the translation queue module;
for each translation walk queue entry:
determining a starting virtual address (VA) and a translation mode from a corresponding translation request;
providing a VA and translation mode to a unified translation walk address generation (UTWAG) module comprising a plurality of translation supports that accommodate different translation modes; and
translating the VA to an RA, by the UTWAG module, based on the translation mode.

9. The method of claim 8, wherein the plurality of translation requests is not of uniform mode.

10. The method of claim 8, wherein the plurality of translation requests comprises at least one of:
a hashed page table (HPT) request;
a segment table request;
a non-nested radix request; or
a nested radix request.

11. The method of claim 8, wherein a translation request of the plurality of translation requests is received by a translation cache (XLTC) interface from a translation cache (XLTC) operative to store one or more previous successful translation results.

12. The method of claim 11, wherein the XLTC interface, one or more page table entry group (PTEG) search modules, and the translation queue module are shared by all translation modes.

13. The method of claim 11, wherein the allocating of each translation request to one of the plurality of translation walk queue entries is upon determining that a matching previous result is not found in the XLTC.

14. The method of claim 8, wherein each translation walk queue entry is different for each clock cycle of a processor.

15. The method of claim 8, further comprising providing a round robin arbitration between the plurality of translation walk queue entries.

16. The method of claim 8, wherein the translation supports of the UTWAG module provide at least one of:
a partition table entry real address generation (PATE RA GEN);
a segment table entry group virtual address generation (STEG VA GEN) providing an effective address (EA) to a virtual address (VA) translation;
a segment table entry group real address generation (STEG RA GEN) defining an intermediate virtual address (STEG VA) to a real address (RA) translation;
a page table entry group real address generation (PTEG RA GEN);
a radix host real address generation (RADIX HOST RA GEN); or
a radix guest real address generation (RADIX GUEST RA GEN).

17. The method of claim 8, further comprising coupling a finite state machine to each translation queue entry of the translation queue module.

18. The method of claim 17, wherein the state machine is shared by all translation modes.

19. A computing device comprising:
a processor;
a translation queue module configured to receive different modes of translation requests for a real address (RA) of a physical memory;
a translation cache (XLTC) interface configured to receive successful translation results for previous requests for an RA and provide the previous successful translation result to the translation queue module;
at least one of a page table entry group (PTEG) search module or a segment table entry group (STEG) search module coupled to the translation queue module;
a memory coupled to the processor;
a unified translation walk address generation (UTWAG) software module stored in the memory, wherein an execution of the UTWAG by the processor configures the computing device to provide a translation support for each mode of the different modes of translation request; and
a memory interface coupled between the UTWAG and the physical memory, wherein a sequence module of the translation queue module is configured to process each of the translation requests.

20. The computing device of claim 19, wherein the XLTC interface, the PTEG search modules, and the translation queue module are shared by all translation modes.

21. The computing device of claim 19, wherein the modes of translation request comprise at least one of:
   a hashed page table (HPT) request;
   a segment table request;
   a non-nested radix request; or
   a nested radix request.

22. The computing device of claim 19, wherein the translation supports of the UTWAG module include at least one of:
   a partition table entry real address generation (PATE RA GEN);
   a segment table entry group virtual address generation (STEG VA GEN) operative to provide an effective address (EA) to a virtual address (VA);
   a segment table entry group real address generation (STEG RA GEN) operative to define an intermediate virtual address (STEG VA) to a real address (RA) translation;
   a page table entry group real address generation (PTEG RA GEN);
   a radix host real address generation (RADIX HOST RA GEN); or
   a radix guest real address generation (RADIX GUEST RA GEN).

23. The computing device of claim 19, further comprising a finite state machine coupled to each translation queue entry of the translation queue module.

24. The computing device of claim 23, wherein the state machine is shared by all translation modes.

* * * * *